United States Patent
Yoshida

(10) Patent No.: US 7,836,024 B2
(45) Date of Patent: Nov. 16, 2010

(54) FILE GENERATING METHOD AND FILE RETRIEVING METHOD

(75) Inventor: Hideaki Yoshida, Hachioji (JP)

(73) Assignee: Olympus Corporation, Tokyo (JP)

( * ) Notice: Subject to any disclaimer, the term of this patent is extended or adjusted under 35 U.S.C. 154(b) by 1031 days.

(21) Appl. No.: 11/159,573

(22) Filed: Jun. 23, 2005

(65) Prior Publication Data

US 2006/0010158 A1  Jan. 12, 2006

(30) Foreign Application Priority Data

Oct. 22, 2003  (JP)  ............... 2003-362162

(51) Int. Cl.
*G06F 7/00* (2006.01)

(52) U.S. Cl. ...................... 707/674; 707/679

(58) Field of Classification Search ............... 707/102, 707/1, 2, 674, 679; 358/1.12, 1.16, 1.18
See application file for complete search history.

(56) References Cited

U.S. PATENT DOCUMENTS

| | | | | |
|---|---|---|---|---|
| 5,857,204 | A * | 1/1999 | Lordi et al. | 707/202 |
| 5,930,801 | A * | 7/1999 | Falkenhainer et al. | 1/1 |
| 6,483,602 | B1 * | 11/2002 | Haneda | 358/1.16 |
| 7,130,867 | B2 * | 10/2006 | Luke | 1/1 |
| 2002/0054207 | A1 | 5/2002 | Iizuka et al. | |
| 2002/0071616 | A1 | 6/2002 | Yoshida | |
| 2002/0186412 | A1 * | 12/2002 | Murashita | 358/1.16 |
| 2003/0220894 | A1 * | 11/2003 | Russon | 707/1 |
| 2004/0117411 | A1 * | 6/2004 | Ueda et al. | 707/200 |
| 2005/0035963 | A1 * | 2/2005 | Iizuka et al. | 345/419 |
| 2006/0017823 | A1 * | 1/2006 | Kuroiwa | 348/231.99 |
| 2006/0238619 | A1 * | 10/2006 | Takahashi | 348/207.1 |
| 2006/0259516 | A1 * | 11/2006 | Stakutis et al. | 707/200 |
| 2008/0034021 | A1 * | 2/2008 | De Spiegeleer | 707/204 |
| 2008/0104509 | A1 * | 5/2008 | Walker | 715/276 |

FOREIGN PATENT DOCUMENTS

| | | |
|---|---|---|
| EP | 1 087 307 | 3/2001 |
| EP | 1 235 143 A2 | 8/2002 |
| JP | 6-35780 | 2/1994 |

(Continued)

OTHER PUBLICATIONS

EPO Communication (1 pg.) transmitting European Search Report (1 pg.), Annex to the European Search Report on Patent Application No. EP 07001509 (1 pg.), and a Notification EPO Form 1703 (4 pgs.), for European Patent Application No. 07001509.4-1225 mailed Mar. 1, 2007.

(Continued)

*Primary Examiner*—Wilson Lee
*Assistant Examiner*—Angela M Lie
(74) *Attorney, Agent, or Firm*—Straubo & Pokotylo; John C. Pokotylo

(57) ABSTRACT

When image data is a stereo image, information indicating that an image file to be generated is a stereo file, information indicating a frame number, information indicating whether photographing is performed from a left visual point or a right visual point are generated as a file name, and a file name conforming to a predetermined format is generated. Then, the generated file name is written to a header information portion, generating a file.

13 Claims, 5 Drawing Sheets

| Changed file name | Unchanged file name |
|---|---|
| ABCD | STR001L |
| • | • |
| • | • |
| • | • |
| EFGH | STR002R |
| • | • |
| • | • |
| • | • |
| • | • |

FOREIGN PATENT DOCUMENTS

| | | |
|---|---|---|
| JP | 06-131229 | 5/1994 |
| JP | 3081675 | 6/2000 |
| JP | 2001-103516 | 4/2001 |
| JP | 2001-306378 | 11/2001 |
| JP | 2002-189746 | 7/2002 |
| JP | 2002189746 A * | 7/2002 |

OTHER PUBLICATIONS

PCT Notification of Transmittal of Translation of the International Preliminary Report on Patentability for International Patent Application No. PCT/JP2004/015511, (1 pg.).

PCT International Preliminary Report on Patentability for International Patent Application No. PCT/JP2004/015511, (1 pg.).

PCT Written Opinion of the International Searching Authority Translation for International Patent Application No. PCT/JP2004/015511, (5 pgs.).

Notification of Reasons for Rejection for Japanese Patent Application No. 2004-306110, mailed Feb. 23, 2010 (2 pgs.) with translation (2 pgs.).

* cited by examiner $$\left\{\begin{array}{l}\underbrace{STR}_{100}\ \underbrace{001}_{200}\ \underbrace{L}_{300}\quad\cdots\text{ Left image}\\ \\ \underbrace{STR}_{100}\ \underbrace{001}_{200}\ \underbrace{R}_{300}\quad\cdots\text{ Right image}\end{array}\right.$$
F I G. 2A
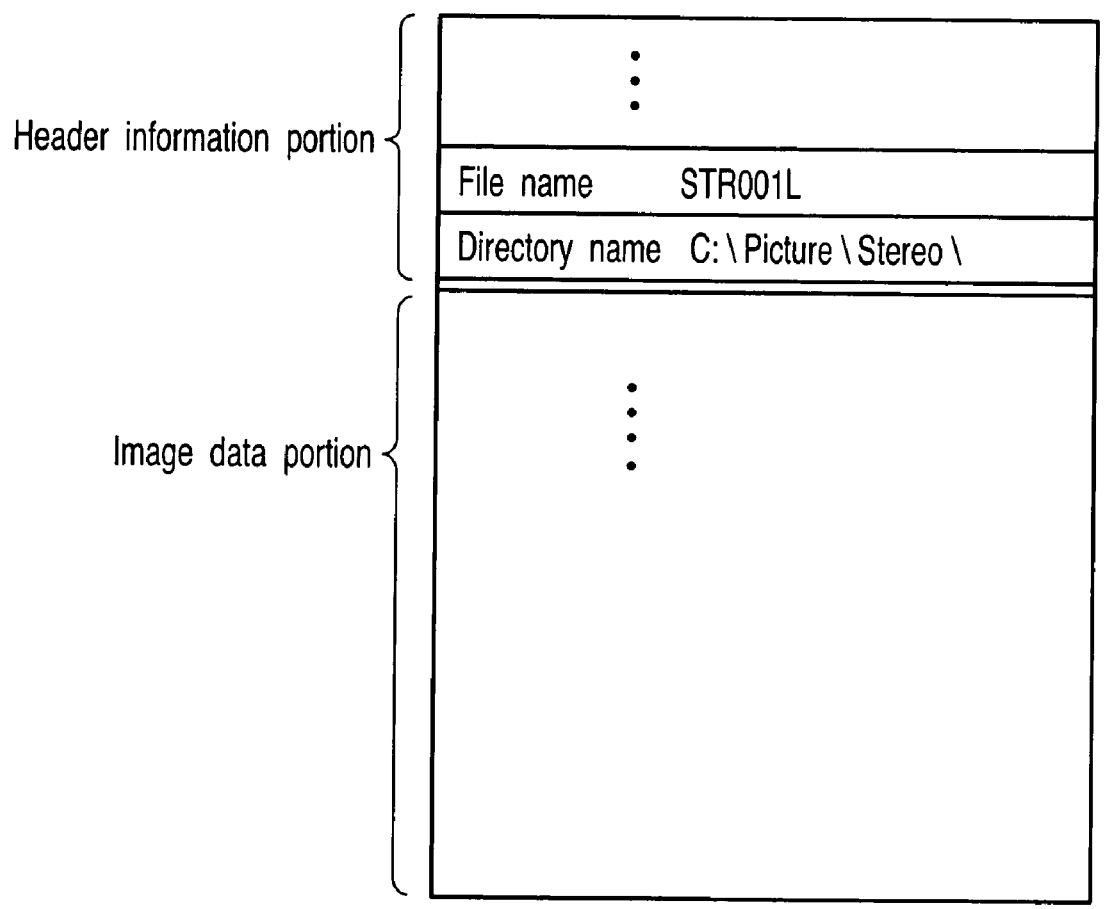
F I G. 2B

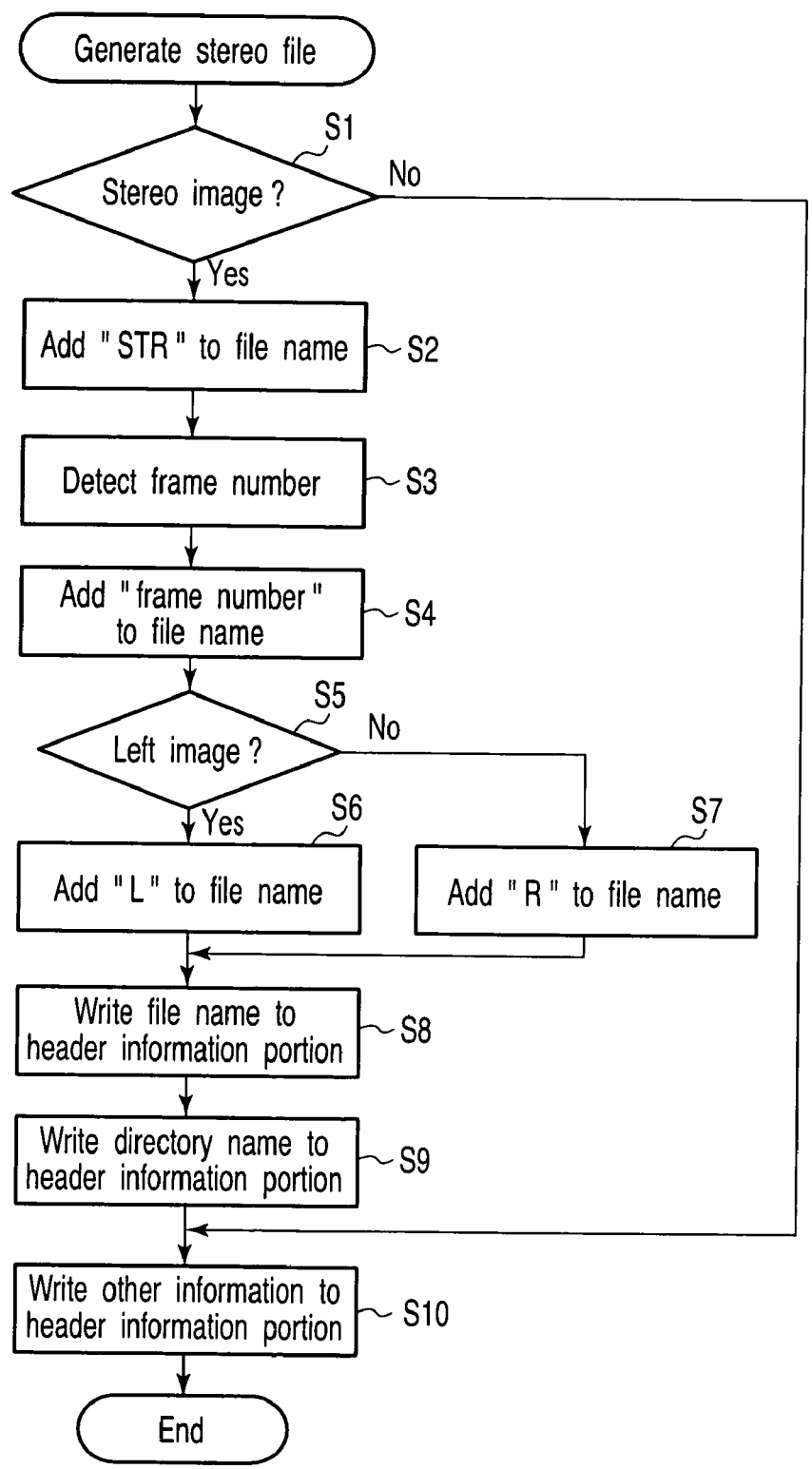
F I G. 3

| Changed file name | Unchanged file name |
|---|---|
| ABCD<br>⋮<br>EFGH<br>⋮ | STR001L<br>⋮<br>STR002R<br>⋮ |

ABCD ☐☐☐☐ ・・・・・・ ☐☐☐☐ STR 001 L
─── ──────────────────── ─── ─── ─
400              500                 100 200 300

FILE GENERATING METHOD AND FILE RETRIEVING METHOD

CROSS-REFERENCE TO RELATED APPLICATIONS

This is a Continuation Application of PCT Application No. PCT/JP2004/015511, filed Oct. 20, 2004, which was published under PCT Article 21(2) in Japanese.

This application is based upon and claims the benefit of priority from prior Japanese Patent Application No. 2003-362162, filed Oct. 22, 2003, the entire contents of which are incorporated herein by reference.

BACKGROUND OF THE INVENTION

1. Field of the Invention

The present invention relates to a file generating method to be applied to generation of a file, and a file retrieving method to be applied to retrieval of such a file.

2. Description of the Related Art

In the case where stereo-photographing is carried out by using two digital cameras, two image data items can be respectively generated from left and right visual points. U.S. Pat. No. 3,081,675 proposes a technique in which in the case where such image data items are transferred to a personal computer (PC) or the like as an image file, and are managed thereby, stereo images (a pair of images) and a monocular image (one image) can be clearly distinguished from each other, and the pair of images can be correctly retrieved and reproduced. In the technique proposed by U.S. Pat. No. 3,081,675, when a stereo file is generated, a code indicating that the file is a stereo file, a code indicating whether an image is an image generated from a left visual point or an image from a right visual point, and a code indicating the frame number of a picked-up stereo image, etc. are written to a header information portion of the stereo file.

BRIEF SUMMARY OF THE INVENTION

An object of the present invention is to provide a file generating method to be applied to generation of a file, which enables a desired file to be retrieved at a high speed and with reliability, and also a file retrieving method for retrieving such a file.

In order to attain the above object, a file generating method according to a first aspect of the present invention is a file generating method for generating a file including a header information portion, which comprises generating a file name of the file, and writing the file name to the header information portion, and generating the file.

Furthermore, in order to attain the above object, in a file generating method according to a second aspect of the present invention is a file generating method for generating a file having a header information portion, which comprises generating a file name conforming to a predetermined format, and writing the generated file name to the header information portion, and generating the file.

Still furthermore, in order to attain the above object, a file retrieving method according to a third aspect of the present invention is a file retrieving method for retrieving a file having a header information portion, which comprises: retrieving a file by referring to file names; and retrieving, when the above file is not able to be retrieved by referring to the file names, a file by referring to a file name written to the header information portion.

Still furthermore, in order to attain the above object, a file retrieving method according to a fourth aspect of the present invention is a file retrieving method for retrieving a file having a header information portion, which comprises: retrieving a file whether or not a file name partially conforming to a predetermined format is present; and retrieving a file by referring to a file name written to the header information portion, when the file name partially conforming to the predetermined format is not present.

Still furthermore, in order to attain the above object, a file retrieving method according to a fifth aspect of the present invention is a file retrieving method for retrieving, in the case where any one of a pair of stereo files is selected, the other file, which comprises: retrieving the other file by retrieving a file having the same file name as the above selected file; and retrieving, in the case where the other file is not able to be retrieved in the above retrieving, the other file by referring to a file name written to a header information portion of the selected file, and then retrieving a file having a header information portion to which a file name identical to the above file name is written.

BRIEF DESCRIPTION OF THE SEVERAL VIEWS OF THE DRAWING

FIG. 2A is a view for use in explaining the concept of a first embodiment of the present invention, which shows a file name conforming to a predetermined format, which is generated by a file generating method according to the first embodiment of the present invention.

FIG. 2B is a view for use in explaining the concept of the first embodiment of the present invention, which shows a data structure of a file generated by the file generating method according to the first embodiment of the present invention.

FIG. 3 is a flowchart at the time of generating a file name in the first embodiment of the present invention.

DETAILED DESCRIPTION OF THE INVENTION

In the present invention, when a file is generated, its file name and a directory name where the file is recorded are written to a header information portion as occasion arises. At the time of retrieving a file generated in such a manner, first, retrieval, which will finish at a high speed, is carried out by referring to a file name. Then, if it fails, retrieval is carried out by referring to the file name written to the header information portion.

It should be noted that file names in the present invention means names (including extensions) which are given to respective files by an operating system (hereinafter referred to as OS) of a computer in order that the files be managed, but they do not include names given to regions for storing the files, i.e., directory (folder) names. The file name and the directory name can be displayed or rewritten "simply by a standard file operation of the OS without opening the associated file". To be more specific, they are management data of the OS, and are distinguished from file data itself. On the other hand, the header information portion is provided as part of data of the file, and cannot be displayed or rewritten without opening the file. It should be noted that in the following explanations, suppose the OS is Windows (registered trademark) which is a representative OS for general-purpose personal computers.

The embodiments of the present invention will be explained with reference to the accompanying drawings. It should be noted that with respect to the embodiments, generation of a stereo file due to stereo-photographing will be explained by way of example. The file generating method and file retrieving method of the present invention can also be applied to generation of an arbitrary file which is other than generation of a stereo file.

First Embodiment

Figure 1:
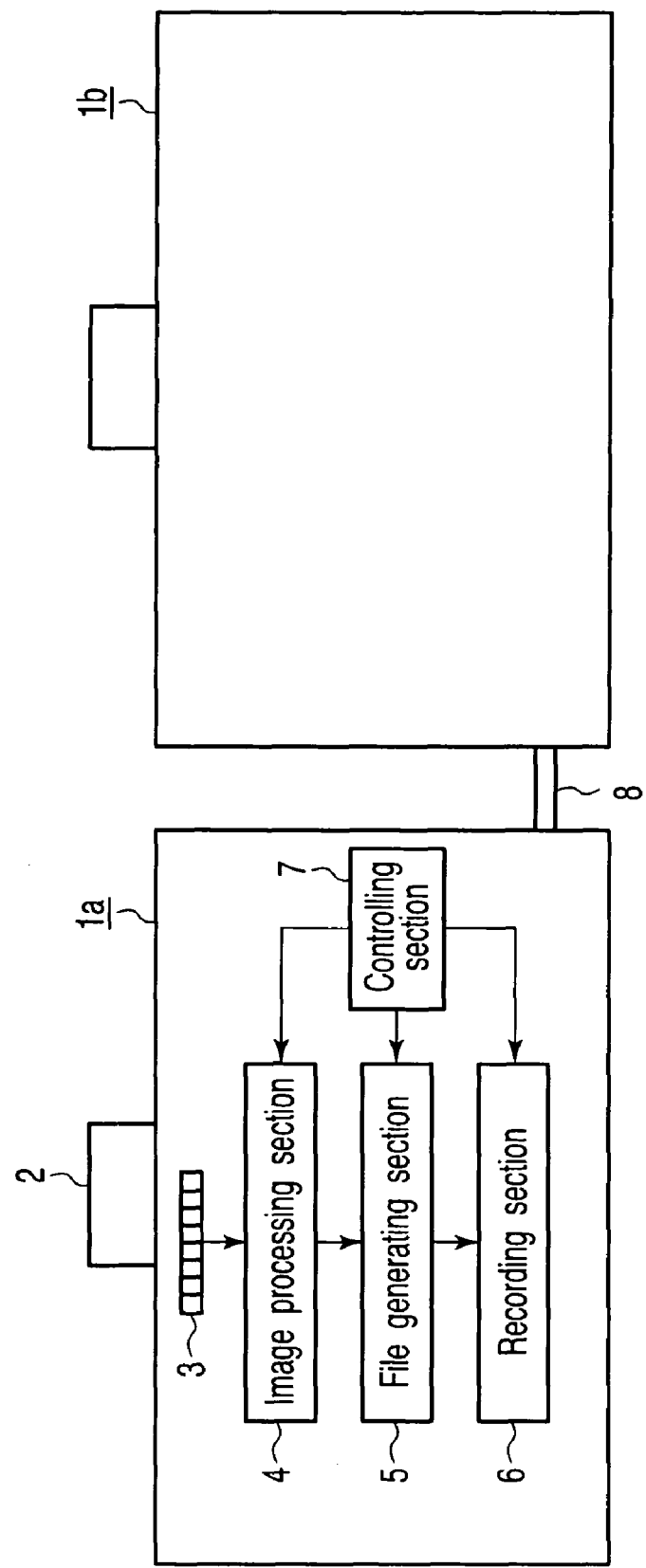
FIG. 1 is a view showing a system configuration at the time of performing stereo-photographing.

FIG. 1 is a view showing a configuration at the time of performing stereo-photographing by using two cameras 1a and 1b. It should be noted that as a basic configuration, a conventional one may be used, and its detailed explanation will thus be omitted. Also, suppose the cameras 1a and 1b have the same structure.

The camera 1a comprises: a photographing lens 2 for making an image of an object to be photographed, not shown, incident; a pickup section 3 for converting the image of the object incident through the photographing lens 2 into an electrical signal; an image processing section 4 for generating image data by performing a predetermined image processing based on the output of the pickup section 3; a file generating section 5 for generating a stereo file from stereo image data generated by the image processing section 4; a recording section 6 where an image file generated by the file generating section 5 is recorded; and a controlling section 7 for performing a centralized control of the camera. Further, the camera 1a is connected with the camera 1b through a communication line 8, and performs a synchronous control of a release timing or the like through the communication line 8.

In the cameras 1a and 1b each having such a structure, the file name of a stereo file generated by the file generating section 5 has such a predetermined format as shown in FIG. 2A. That is, the file name has part 100 indicating that the file is a stereo file, part 200 indicating a frame number at the time of photographing, and part 300 indicating whether the image is an image generated from a left visual point or a right visual point.

Furthermore, in the first embodiment, the file name itself is written to the header information portion of the file as shown in FIG. 2B. Similarly, the directory name at the time of recording the file is also written as shown in FIG. 2B. The file name and the directory name written to the header information portion are not changed, even when the file name on the OS is changed or the file is moved (the directory name on the OS is changed) by a user.

Next, such a file generating method will be explained with reference to FIG. 3. After image data is generated by photographing, the controlling section 7 determines whether the image data is stereo image data or not (step S1). For example, it suffices that this determination is carried out by determining whether the photographing mode of the camera is a stereo-photographing mode or not. When it is determined in step S1 that the image data is stereo image data, the controlling section 7 adds character string "STR" indicating that the file is a stereo file to the file name (step S2).

Next, a frame name is detected (step S3), and it is added to the file name (step S4). Further, it is determined whether the image is a left image or not (step S5). When it is determined in step S5 that the image is a left image, character string "L" indicating that the image is a left image is added to the file name (step S6), and when it is determined whether the image is not a left image, i.e., it is a right image, character string "R" indicating that the image is a right image is added to the file name (step S7).

After a file name (OS file name) is determined in the above manner, the controlling section 7 writes the file name to the header information portion, at the file generating section 5 (step S8). Also, a directory name (also called pass) at the time of recording the file is written to the header information portion (step S9). It should be noted that only a file name may be used without handling a directory name as an item to be written. The file name generated in the above manner is recorded, with an extension (e.g., ".jpg" in image data conforming to JPEG format) added to the file name. Its figure will be omitted.

Thereafter, other information regarding a photographing condition, etc. is written to the header information portion (step S10), and further an image data portion is added, thereby forming a file.

Furthermore, when it is determined in the step S1 that the image data is not stereo image data, the step to be carried out proceeds from step S1 to Step S10. In this case, a file name is not generated in such a predetermined format as shown in FIG. 2A (a file name not conforming to the format is generated). However, needless to say, in such a case also, it may be set that a file name can be formed in such a way as to conform to the format in FIG. 2A. For example, in a monocular image which is not a stereo image, a character string and a photographing frame number, which indicate that the file is a monocular image, are set as a file name, and the file name and a directory name as its recording destination can also be written to the header information portion. Furthermore, needless to say, application of such a file name generating method is not limited to an image file.

If a file name is generated in such a manner, a file can be reliably retrieved at a high speed.

Next, as an example of such retrieval of a file, a method for retrieving, when one of a pair of stereo files is selected, the other (this retrieving method will be hereinafter referred to as pair retrieval) will be explained with reference to FIG. 4. It should be noted that this retrieval is carried out by the controlling section 7 in the camera or a controlling section now shown (which will be hereinafter referred to as controlling section) in a PC.

First, in this retrieval, the controlling section retrieves a file whose file name (OS file name) is the same as that of the selected file (step S11). Actually, a file whose "STR" portion and "frame number" portion are the same as those of the selected file may be retrieved. Such retrieval of a file name can be performed from the result of such retrieval at a high speed, since it can be done without opening a file. Next, the controlling section determines whether a file whose file name is the same as that of the selected file is present or not (step S12).

When determining in step S12 that the file whose file name is the same as that of the selected file is present, the controlling section determines whether the file name of the retrieved file is the same as that written to the header information portion (step S13). When it is determined in step S13 that the file name of the retrieved file is the same as that written to the header information portion, it is determined that retrieval has been correctly performed, and retrieval is completed.

That is, since there is a possibility that the file name (OS file name) may be rewritten by a user, in the first embodiment, the file name of the retrieved file and that written to the header information portion are checked with each other for re-confirmation, even if the file is retrieved by referring to file names.

On the other hand, when it is determined in step S13 that the file name of the retrieved file is not the same as that written to the header information portion, the step to be carried out is returned to step S11, and retrieval of a file name is continued.

Furthermore, when it is determined in step S12 that a file whose file name is the same as that of the selected file is not present, the controlling section performs retrieval by referring to the file name written to the header information portion (step S14). Next, from the result of such retrieval, the controlling section determines whether a file whose file name is the same as that of the file is present or not (step S15).

In the determination in step S15, when the file name is retrieved from the header information portion, it is determined that retrieval has been correctly performed, and retrieval is completed. On the other hand, in step S15, when the file name is not retrieved even by retrieval based on the file name written to the header information portion, a user is informed as an alarm that there is no file to be provided as one of a pair of files (step S16).

Figure 4:
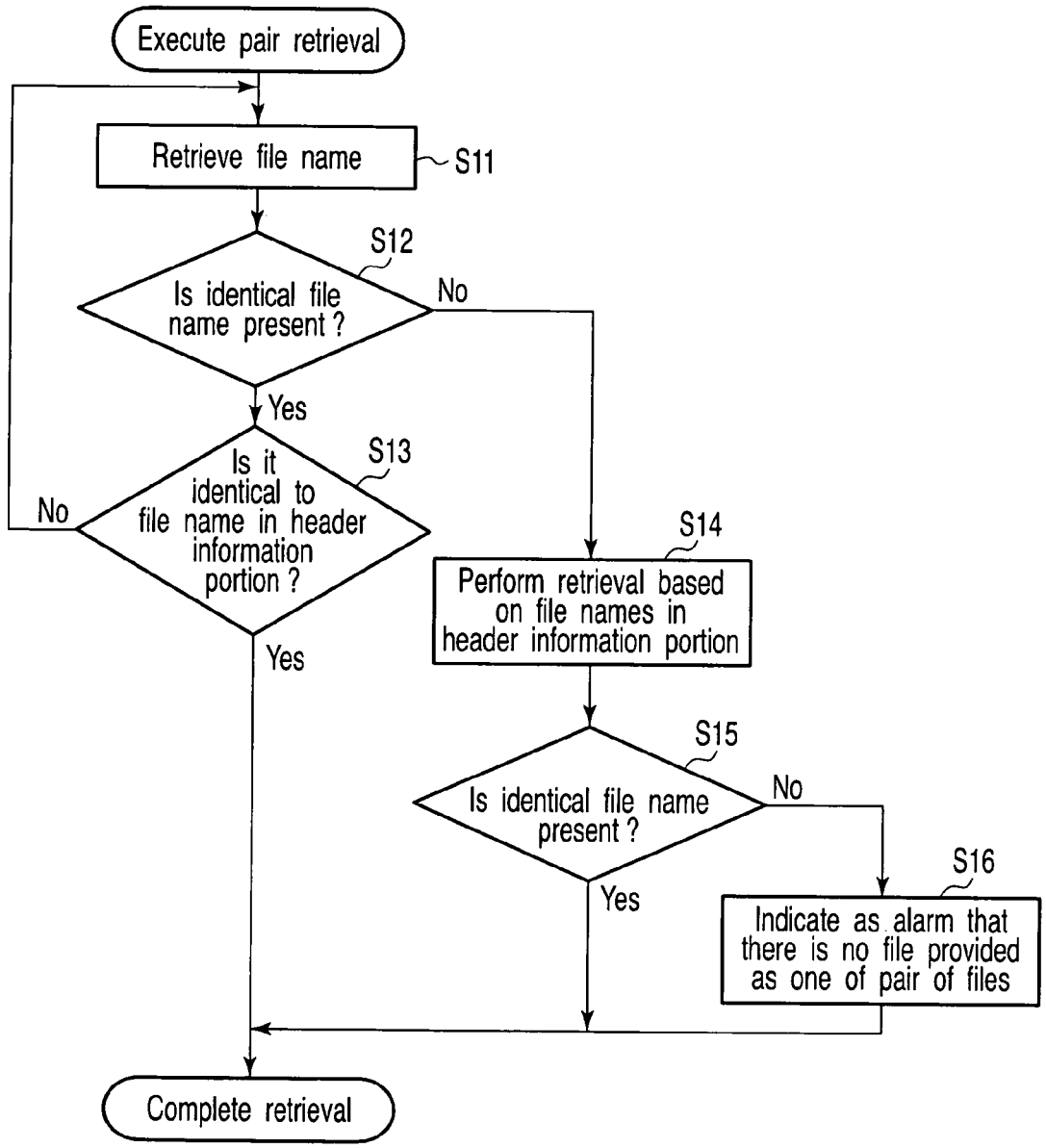
FIG. 4 is a flowchart at the time of retrieving a file in the first embodiment of the present invention.

It should be noted that retrieval in FIG. 4 is an example of retrieval, and retrieval may be performed with respect to file name such that all file names which are provided as respective pairs of file names are retrieved.

Moreover, in the first embodiment, when the file name (OS file name) is changed, file retrieval cannot be performed at a high speed. In consideration of this, in the case where the file name is changed, a user may be informed as an alarm that the speed of retrieval will be lowered since the file name is changed. Also, the changed file name may be changed back to the file name written to the header information portion. Furthermore, when the file name is changed, such table data shown in FIG. 5, which associates changed file names and unchanged file names with each other, may be prepared, and retrieval may be performed in accordance with the table data at the time of retrieval based on file names.

Furthermore, it may be set that a moved file can be returned (an identical file be copied or moved) to the directory written to the header information portion.

As explained above, according to the first embodiment, retrieval which is performed by referring to file names (OS file names) and that which is performed by referring to the file name written to the header information portion are combined, as a result of which a file can be reliably retrieved at a high speed.

Second Embodiment

Next, the second embodiment of the present invention will be explained. In the second embodiment, the format at the time of generating a file name is different from that in the first embodiment.

Figures 5, 6, 7:
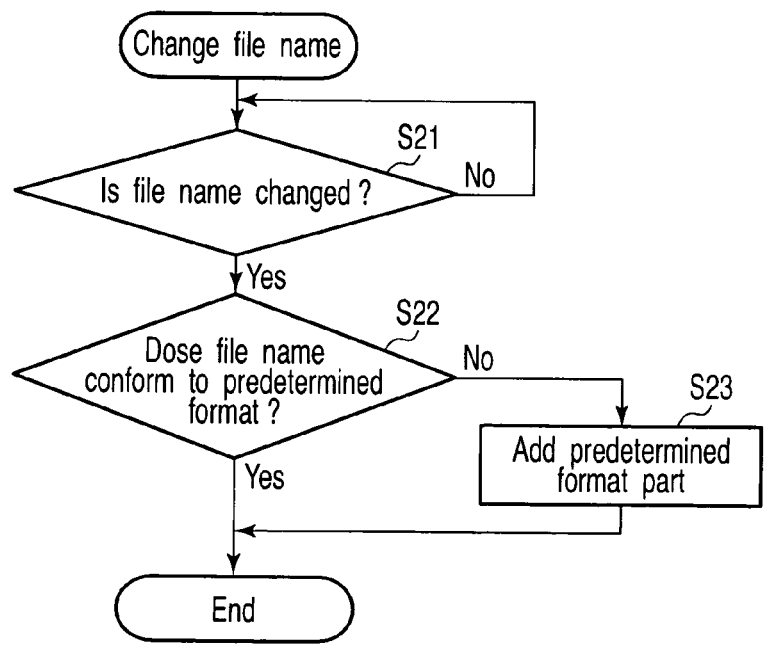
FIG. 5 is a view showing an example of table data which associates unchanged file names with changed file names changed.
FIG. 6 is a view for use in explaining the concept of a second embodiment of the present invention.
FIG. 7 is a flowchart at the time of generating a file name in the second embodiment of the present invention.

In the second embodiment, a predetermined format (parts indicated by numerals 100 to 300) as shown in FIG. 2A is added to file name part 400 determined by a user, as shown in FIG. 6, thereby generating a file name. At this time, blank part 500 may be inserted between file name part 400 and predetermined format part. To be more specific, when a stereo image is recorded, predetermined part is formed as shown in FIG. 7, and separately, a file name arbitrarily determined by the user is input. They are then combined to generate a file name as shown in FIG. 6.

Such a file name is generated by using the method according to the first embodiment. However, thereafter, in the case where the user tries to change the file name, it can also be configured to be generated in accordance with a flowchart shown in FIG. 7.

To be more specific, referring to FIG. 7, the controlling section first determines whether the file name is changed by the user or not (an instruction for changing it is given or not) (step S21), and then when determining that the file name is changed, it determines whether the file name confirms to a predetermined format or not, that is, it determines whether the file name has predetermined format part or not (step S22). In step S22, it is determined that the file name conforms to the predetermined format, the control in the flowchart is completed.

On the other hand, in step S22, it is determined that the file name does not conform to the predetermined format, predetermined format part is added to generate a file name (step S23). The predetermined format part is explained in FIG. 3, and its explanation will thus be omitted in this section.

In such a manner, if predetermined format part is necessarily added to the file name determined by the user, he or she can determine his or her desired file name, and in addition retrieval can be necessarily performed at a high speed by paying attention to only the predetermined format part at the retrieving time, and performing pair retrieval.

In the second embodiment, the file name necessarily includes predetermined format part, and thus basically retrieval can be carried out with only retrieval of a file name (OS file name). However, it is more preferable that a file name be written to the header information portion in order that retrieval be more reliably performed.

As explained above, according to the second embodiment, retrieval can be carried out with only retrieval of a file name.

It should be noted that the above embodiments have been explained by referring to the case where a stereo file is generated due to stereo-photographing. However, the file generating method and file retrieving method of the present invention can be applied to generation of an arbitrary file other than the stereo file. It can be proposed that a rule for determining a name is determined in the same manner as in the stereo file, and the file generating method and file retrieving method are applied, with respect to an object, in the case where it is preferable that a number of photographs (files) of the object, such as story photographs or photographs generated by continuous shooting, be handled as one set. Also, as another example, the present invention can be applied to generation of a file which conforms to a rule for determining a file name, which is provided to identify color space by the DCF standard.

Furthermore, in all the above explanations, it is supposed that Windows is applied as the OS. However, needless to say, the present invention can also be effectively applied to an arbitrary OS such as MS-DOS, Mac-OS, UNIX or Linux (which are registered trademarks).

The present invention has been explained with respect to the embodiments. However, needless to say, the invention is not limited to the embodiments, and can be variously modified or applied without departing from the subject matter of the present invention.

Furthermore, the above embodiments contain a number of inventive steps at different levels. Thus, various inventions can be extracted by properly combining a number of disclosed structural elements. For example, even if some structural elements are deleted from all the structural elements in the embodiments, and then if the problem in the problem to be solved section can be solved, and the advantage in the advantage of the invention section can be generated, a structural not including the above deleted structural elements can be extracted as an invention.

The present invention can provide a file generating method to be applied to generation of a file, which enables a desired file to be reliably retrieved at a high speed, and also a file retrieving method for retrieving such a file.

What is claimed is:

1. A file generating method for generating a file including a header information portion provided as a part of the data of the file itself, comprising:

generating a file name of the file, which is one of management data of the operating system;

generating the file by writing the generated file name to the header information portion; and performing, in response to a, file retrieval,
   (1) determining that the file name is changed from the generated file name, and
   (2) responsive to the determination that the file name is changed, writing to change the changed file name back to the generated file name, in accordance with the file name written to the header information portion.

2. The file generating method according to claim 1, wherein the step of generating the file includes writing a directory name at time of recording the file to the header information portion.

3. The file generating method according to claim 1, which further comprises giving an alarm when the file name is changed.

4. The file generating method according to claim 1, which further comprises generating, when the file name is changed, table data in which the changed file name and the file name not changed are associated with each other based on the file name written to the header information portion.

5. The file generating method according to claim 1, further comprising:

generating a second file name conforming to a predetermined format, which is one of management data of the operating system;

generating a second file by writing the generated second file name to a header information portion of the second file; and performing, in response to a file retrieval of the second file,
   (1) determining that the second file name is not changed from the generated second file name, and
   (2) responsive to the determination that the second file name is not changed, maintaining the second file.

6. A file generating method for generating a file including a header information portion provided as a part of the data of the file itself, comprising:

generating a file name conforming to a predetermined format, which is one of management data of the operating system;

generating the file by writing the generated file name to the header information portion; and performing, in response to a file retrieval,
   (1) determining that the file name is changed from the generated file name, and
   (2) responsive to the determination that the file name is changed, writing to change the changed file name back to the generated file name, in accordance with the file name written to the header information portion.

7. The file generating method according to claim 6, wherein the file name conforming to the predetermined format is a file name indicating a kind of the file.

8. The file generating method according to claim 6, wherein the file name conforming to the predetermined format is a file name indicating that the file is a stereo file obtained by stereo-photographing.

9. The file generating method according to claim 6, which further comprises giving an alarm when the file name is changed.

10. The file generating method according to claim 6, which further comprises generating, when the file name is changed, table data in which the changed file name and the file name not changed are associated with each other based on the file name written to the header information portion.

11. The file generating method according to claim 6, wherein the step of generating the file includes writing a directory name at time of recording the file to the header information portion.

12. The file generating method according to claim 6, which further comprises:

determining, at time of generating a file name, whether or not the generated file name is a file name conforming to the predetermined format;

adding, when it is determined that the file name is not the file name conforming to the predetermined format, the file name conforming to the predetermined format to a present file name, thereby generating a new file name.

13. The file generating method according to claim 6, further comprising:

generating a second file name conforming to a predetermined format, which is one of management data of the operating system;

generating a second file by writing the generated second file name to a header information portion of the second file; and performing, in response to a file retrieval of the second file,
   (1) determining that the second file name is not changed from the generated second file name, and
   (2) responsive to the determination that the second file name is not changed, maintaining the second file.

* * * * *